United States Patent [19]

Ueda et al.

[11] Patent Number: 5,194,052

[45] Date of Patent: Mar. 16, 1993

[54] STEPLESS TRANSMISSION FOR VEHICLES

[75] Inventors: Kazuhiko Ueda, Hatsukaichi; Seiji Esaki, Hiroshima; Osamu Sado, Higashihiroshima, all of Japan

[73] Assignee: Mazda Motor Corporation, Hiroshima, Japan

[21] Appl. No.: 859,013

[22] Filed: Mar. 30, 1992

[30] Foreign Application Priority Data

Mar. 29, 1991 [JP] Japan .................. 3-067124

[51] Int. Cl.$^5$ .......................................... F16H 3/44
[52] U.S. Cl. ........................................ 475/66; 475/70
[58] Field of Search ............... 475/50, 52, 66, 70, 475/114, 137

[56] References Cited

U.S. PATENT DOCUMENTS

| 4,290,320 | 9/1981 | Abbott | 475/66 |
| 4,624,153 | 11/1986 | Itoh et al. | 475/66 |
| 4,644,821 | 2/1987 | Sumiyoshi et al. | 475/66 |
| 4,649,773 | 3/1987 | Svab | 475/66 |
| 4,856,369 | 8/1989 | Stockton | 475/66 X |
| 4,901,597 | 2/1990 | Hattori et al. | 475/66 X |

FOREIGN PATENT DOCUMENTS 2-240444  9/1990  Japan .

*Primary Examiner*—Dirk Wright
*Attorney, Agent, or Firm*—Keck, Mahin & Cate

[57] ABSTRACT

A hydraulically operated stepless transmission has a first power flow path established so as to include a torque converter and a reverse and reduction gear and a second power flow path established so as to include a stepless transmission gear. The first and second flow paths are selectively available. A hydraulic control circuit, including at least one oil pump, causes a decrease in quantity of a lubrication oil delivered to the stepless transmission gear while the first power flow path is established, and causes a decrease in quantity of a working oil delivered to the torque converter while the second power flow path is established.

7 Claims, 5 Drawing Sheets

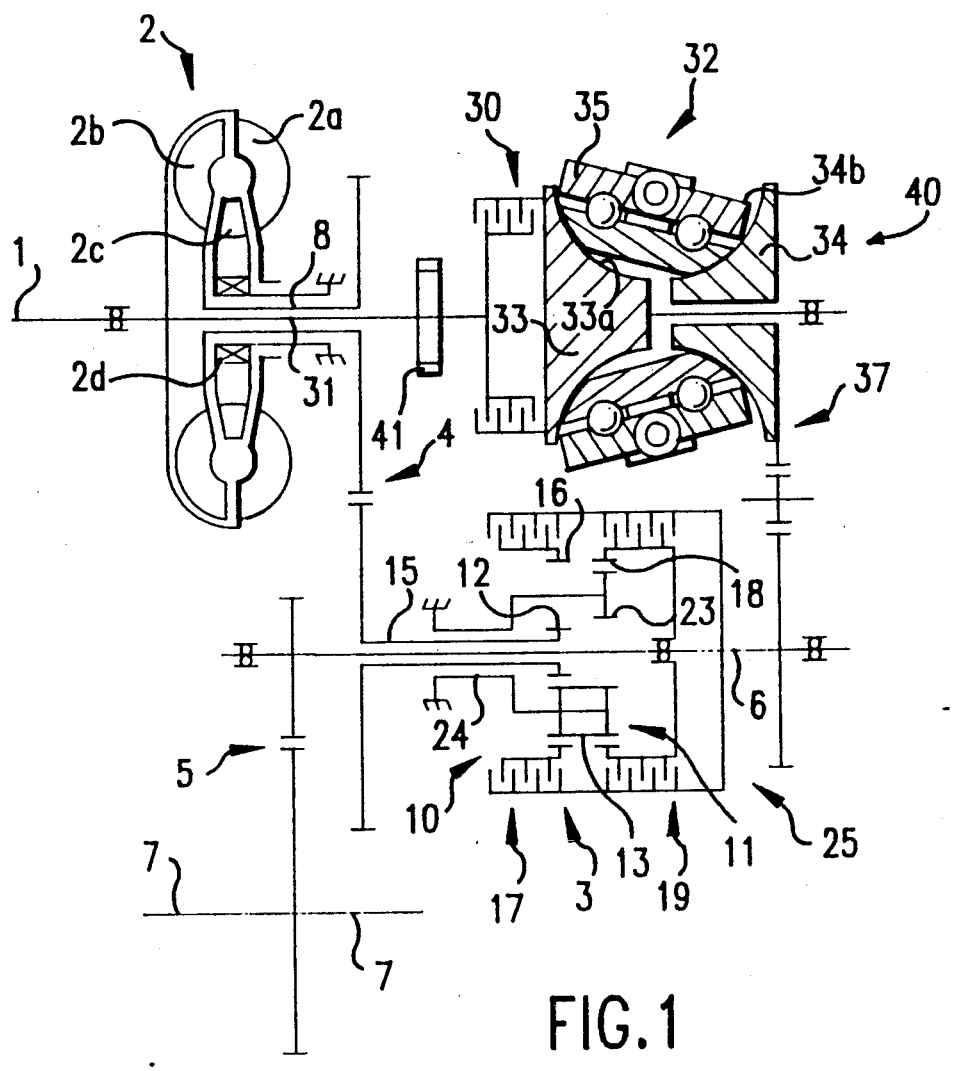
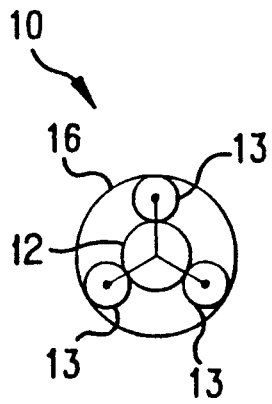
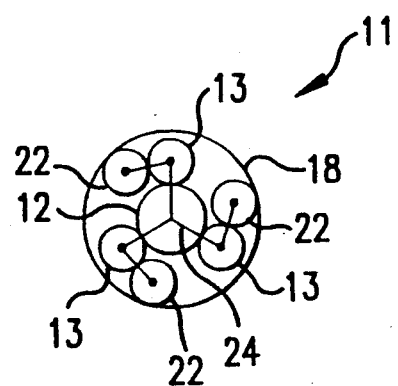
FIG.1
FIG.2
FIG.3

STEPLESS TRANSMISSION FOR VEHICLES

BACKGROUND OF THE INVENTION

1. Field of the Invention

The present invention relates to a stepless transmission for automobiles or other vehicles and, more particularly, to a stepless transmission having a torque converter.

2. Description of Related Art

Some stepless transmissions of this kind have two, or first and second, power flow paths through which engine output is transmitted to a transmission output shaft. When the first power flow path is established, engine output travels from an engine through a torque converter and a forward-reverse change and speed reduction gear to the transmission output shaft. When the second power flow path is established, engine output travels from the engine through a clutch and a stepless transmission gear to the transmission output shaft. In such a stepless transmission, the first power flow path is provided when the vehicle starts, and the second power flow path is provided when the vehicle speeds up and needs no torque multiplication by the torque converter. The provision of two power flow paths which are selectively established enables stepless transmissions to be constructed compactly. Such a stepless transmission is known from, for instance, Japanese patent application No. 1-59,625, entitled "Transmission For Automobiles," filed on Mar. 14, 1989 and published as Japanese Unexamined Patent Publication No. 2-240,444 on Sep. 25, 1990.

Typically, a stepless transmission includes a torque converter and has a forward-reverse change and speed reduction gear and stepless transmission gears. A typical stepless transmission needs an oil pump for operating and lubricating these transmission elements. When considering the necessary amount of oil which must be supplied to the hydraulically controlled elements of the transmission, when the first power flow path, which includes the torque converter, is established, since the stepless transmission gear does not transmit engine torque therethrough, it is not necessary for the stepless transmission to be hydraulically controlled. On the other hand, when the second power flow path, which includes the stepless transmission means, is established, since the torque converter is locked so as to provide a one to one ratio of rotation between its driven and driving members, i.e., a pump and a turbine, and allows no relative rotation between the pump and the turbine, and since the forward-reverse change and speed reduction gear is not unlocked or released, no oil is needed for operating only the torque converter and forward-reverse change and speed reduction gear. Accordingly, in order to apply a sufficient quantity of oil to all hydraulically controlled elements of the stepless transmission and to circulate the oil, a large capacity oil pump is essential. When a large capacity oil pump is used, however, only a part of the discharged oil is effectively utilized; the remaining part of the discharged oil is returned into an oil tank without being used.

SUMMARY OF THE INVENTION

It is an object of the present invention to provide a stepless transmission which needs only a small capacity oil pump.

It is another object of the present invention to provide a stepless transmission which can provide a reduction in the loss of engine output and which can improve fuel economy.

These objects of the present invention are accomplished by providing a stepless transmission which allows engine power to be transmitted through two different and selectively established power flow paths. Through the first power flow path, engine output is transmitted to a transmission output shaft from an engine output shaft through a torque converter. Then, the engine output is transmitted to a forward-reverse change and speed reduction gear (which is referred to hereafter as a reverse-reduction gear for simplicity). Through the second power flow path, engine output is transmitted to the transmission output shaft from the engine output shaft through a stepless transmission gear. The stepless transmission is controlled by a hydraulic control means so as to reduce the amount of oil delivered to the stepless transmission gear when the first power flow path is selectively established and reduce the amount of oil delivered to the torque converter when the second power flow path is selectively established.

Oil delivery may be performed by two oil pumps. One of these two oil pumps develops a low oil pressure and discharges a large quantity of oil to the torque converter and the stepless transmission gear. The other of the two oil pumps develops a high oil pressure and discharges a small quantity of oil to the reverse-reduction gear and the stepless transmission gear.

BRIEF DESCRIPTION OF THE DRAWINGS

The above and other objects and features of the present invention will be clearly understood from the following description of a preferred embodiment thereof when considered in conjunction with the appended drawings. In the drawings, similar reference numerals have been used to designate the same or similar elements.

FIG. 1 is a skeleton diagram showing a stepless transmission in accordance with a preferred embodiment of the present invention;

FIG. 2 is a schematic front view of a single planetary gear of a reverse-reduction gear;

FIG. 3 is a schematic front view of a double planetary gear of a reverse-reduction gear;

DETAILED DESCRIPTION OF THE PREFERRED EMBODIMENTS

Figure 4:
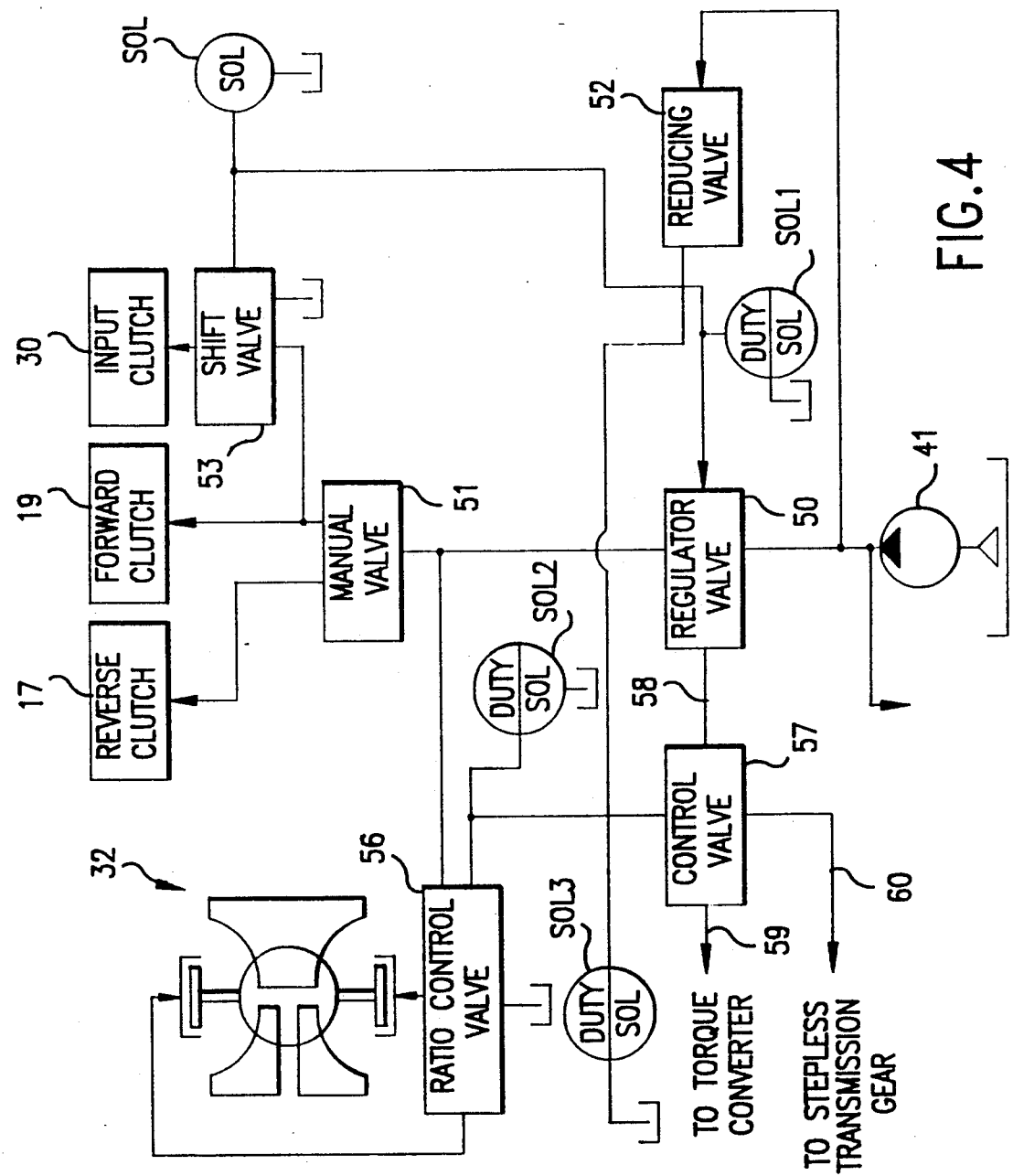
FIG. 4 is a diagram showing a hydraulic control circuit for the stepless transmission shown in FIG. 1.

Referring to the drawings in detail and, particularly, to FIG. 1, a stepless transmission in accordance with a preferred embodiment of the present invention is shown and is provided with a torque converter 2. The torque converter 2, which is of a well known type, includes an impeller or pump 2a directly fastened to an engine output shaft 1, such as an engine crankshaft, a turbine 2b fastened to a turbine shaft or converter output shaft 8 coaxially and rotatively mounted on the engine output shaft 1, and a stator 2c disposed between the pump 2a and turbine 2b. The torque converter 2 has a counter gear 4 secured to the converter output shaft 8, through which the torque converter is operationally coupled to a reverse and reduction gear 3. The stator 2c is fixed to a converter casing (not shown) through a one-way clutch 2d so as to be disabled from turning in a direction opposite to a direction in which the turbine 2b turns.

Reverse and reduction gear 3 has an output shaft 6 which is operationally coupled by means of an output gear train 5 to a front axle 7, which is connected to front wheels (not shown). The reverse and reduction gear 3 includes a single planetary gear type of front planetary gear 10 and a double planetary gear type of rear planetary gear 11. As shown in FIGS. 2 and 3, these planetary gears 10 and 11 commonly share a sun gear 12 and a pinion gear 13. The sun gear 12 is connected to an input shaft 15 disposed coaxially with the output shaft 6. The input shaft 15 is operationally connected to the torque converter 2 through the counter gear train 4. A ring gear 16 of the front planetary gear 10 is connected to the output shaft 6 through a hydraulically operated reverse clutch 17. Similarly, a ring gear 18 of the rear planetary gear 11 is connected to the output shaft 6 through a hydraulically operated forward clutch 19. A carrier 24, carrying short and long pinion gears 22 and 23 of the rear planetary gear 11, is operationally fixed to a reduction and reverse gear casing (not shown).

By operationally connecting the torque converter 2 and the reverse and reduction gear 3 in this way, a first power transmission path 25 is formed to transmit engine output to the output shaft 6 from the torque converter 2 through the reverse and reduction gear 3 and the counter gear train 4.

Engine output shaft 1 has a shaft extension 31 through which the torque converter 2 is directly coupled to a hydraulically operated lock-up and input clutch 30 (which will be referred to, for simplicity, as an input clutch) and a stepless transmission 32. The stepless transmission 32 includes an input disk 33 and an output disk 34, which are opposite to each other and form lateral semi-spherical surfaces 33a at their opposite sides. The stepless transmission 32 also includes a pair of slide roller assemblies 35 which slide on the lateral semi-spherical surfaces 33a formed between the input and output disks 33 and 34 so as to incline with respect to the axis of rotation of the stepless transmission 32. The slide roller assemblies 3 transmit engine output from the input disk 33 to the output disk 34 and change effective diameters of the input and output disks 33 and 34 according to inclinations thereof with respect to the axis of rotation of the stepless transmission 32 for steplessly changing the transmission ratio of the transmission 32. The input disk 33 is connected to the input clutch 30. On the other hand, the output disk 34 is attached to a counter gear train 37 through which the output disk 34 is operationally connected with the input shaft 6 of the reverse and reduction gearing 3.

By operationally converting the torque converter 2 and the stepless transmission 32 in this way, a second power transmission path 40 is formed so that engine output is transmitted to the output shaft 6 from the torque converter 2 through the stepless transmission 32 and the counter gear train 37. Shaft extension 31 of the engine output shaft 1 is attached to an oil pump 41 so as to drive it and apply oil to the clutches 17, 19 and 30.

When the transmission is in a drive (D) range for starting, only the forward clutch 19 is locked to establish the first transmission path 25. Locking the forward clutch 19 allows engine output to be transmitted from the torque converter 2 to the output shaft 6 through, in order, the sun gear 12, and then the pinion gear 13, the pinion gear 23 and the ring gear 18 of the rear planetary gear 11, and the forward clutch 19. On the other hand, when the transmission is in a reverse (R) range for driving backward, only the reverse clutch 17 is locked to use the first transmission path 25. Locking the reverse clutch 19 allows engine output to be transmitted from the torque converter 2 to the output shaft 6 through, in order, the sun gear 12, and then the pinion gear 13, the ring gear 16 of the front planetary gear 10, and the reverse clutch 17.

During forward driving in the drive (D) range, only the input clutch 30 is locked so as to establish the second power transmission path 40. This allows engine output to be transmitted from the shaft extension 31 of the engine output shaft 1 to the output shaft 6 through, in order, the input clutch 30, and then the stepless transmission 32 and the counter gear train 37.

When the transmission is in a neutral (N) range, all of the clutches 17, 19 and 30 are unlocked. As a result, engine output is transmitted from the torque converter 2 to the ring gear 16 of the front planetary gear 10 through, in order, the counter gear train 4 and the sun gear 12, so that the engine idles.

FIG. 4 shows a hydraulic control circuit for locking and unlocking the hydraulically operated clutches 17, 19 and 30. Oil discharged by the oil pump 41 is partly delivered to the clutches 17, 19 and 30 through a hydraulically controlled regulator valve 50 and a manually operated valve 51. A part of the oil discharged by the oil pump 41 is controlled by a duty solenoid valve SOL1 after being reduced in pressure by a reducing valve 52. The regulator valve 50 has a pilot pressure applied to it by oil, which is controlled by the duty solenoid valve SOL1 so that a high line pressure is applied which corresponds to the pilot pressure for the manually operated valve 51. Oil at low pressure is delivered to a control valve 57 which will be described in detail later.

Between the manual valve 51 and the input clutch 30, there is a shift valve 53 controlled by a solenoid SOL so that transmission of line pressure is connected to and disconnected from the input clutch 30 by the shift valve 53. The line pressure delivered by the regulator valve 50 is applied to an angle control mechanism for controlling the angle of inclination of the roller assemblies 35 of the stepless transmission 32 through a ratio control valve 56. The ratio control valve 56 is controlled by an oil pilot pressure; this oil pilot pressure is duty-controlled by a duty solenoid valve SOL2 after being reduced by the reducing valve 52. An oil pressure corresponding to the pilot pressure is developed, therefore. With the oil pressure developed by the ratio control valve 56, the angle of inclination of the roller assemblies 35 of the stepless transmission 32 with respect to the axis of the rotation of the transmission 32 is changed so that a desired angle is reached. The oil at a low pressure, which is delivered through the regulator valve 50, is applied to the control valve 57. This control valve 57 is controlled with an oil pilot pressure, which is duty-controlled by a duty solenoid valve SOL3 after being reduced by the reducing valve 52.

Figure 5:
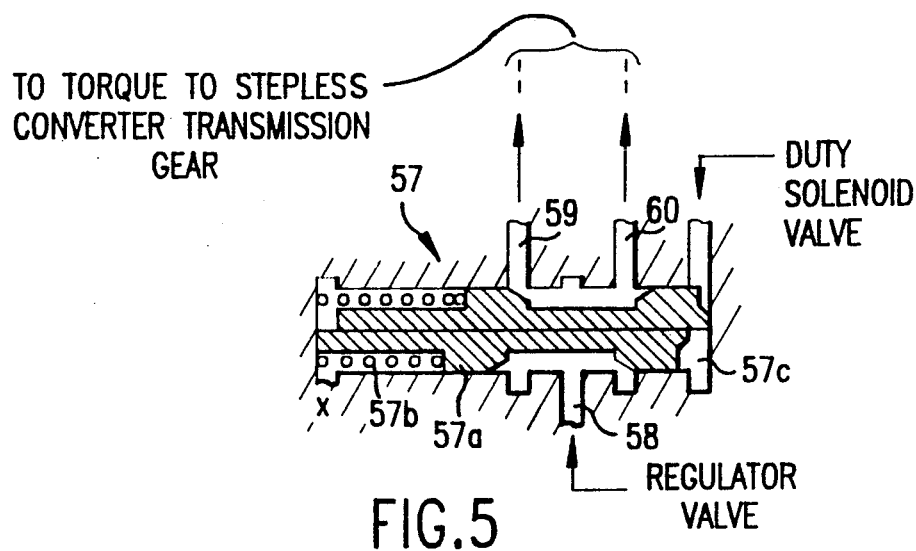
FIG. 5 is a detailed cross-sectional view of a control valve of the hydraulic control circuit shown in FIG. 4.

FIG. 5 shows details of the control valve 57. Inside the control valve 57, there is a spool 57a, which is urged by a spring to move to the right as viewed in FIG. 5. The spool 57a is formed with a pilot pressure chamber 57c at the right end in which the pilot pressure controlled by the duty solenoid valve SOL3 acts. The control valve 50 is also formed with an opening 58 through which low pressure oil is delivered, and openings 59 and 60, which are in communication with the torque converter 2 and the stepless transmission 32, respectively. When the pressure acting on the pilot pressure chamber 57c is 0 (zero), i.e., the duty solenoid valve SOL3 is turned off or de-energized, the spool 57a is positioned as shown by an upper half of the spool 57a in FIG. 5 so as substantially to close the opening 59 in communication with the torque converter 2 and open the opening 60 in communication with the stepless transmission 32. On the other hand, when the pressure acting on the pilot pressure chamber 57c is high, i.e., the duty solenoid valve SOL 3 is turned on or energized, the spool 57a is positioned as shown by a lower half of the spool 57a in FIG. 5 so as to open the opening 59 in communication with the torque converter 2 and substantially close the opening 60 in communication with the stepless transmission 32.

Duty solenoid valve SOL3 is controlled to operate at a high duty rate, at long time periods of energization, when engine output is transmitted through the first power path 25. Conversely, the duty solenoid valve SOL3 operates at a low duty rate, i.e., at short time periods of energization, when engine output is transmitted through the second power path 40.

In the operation of a stepless transmission constructed in this way, when the first power path 25 is established to transmit engine output power to the output shaft 6, the spool 57a of the control valve 57 is positioned as shown by the lower half of the spool 57a in FIG. 5 so a to substantially close the opening 60 in communication with the stepless transmission 32. This decreases the amount of low pressure oil applied to the stepless transmission 32 from the regulator valve 50. On the other hand, when the second power path 40 is established to transmit engine output power to the output shaft 6, the spool 57a of the control valve 57 is positioned as shown by the upper half of the spool 57a in FIG. 5 so as to substantially close the opening 59 in communication with the torque convertor 2. This decreases the amount of the low pressure oil applied to the torque convertor 2 from the regulator valve 50.

Figure 6:
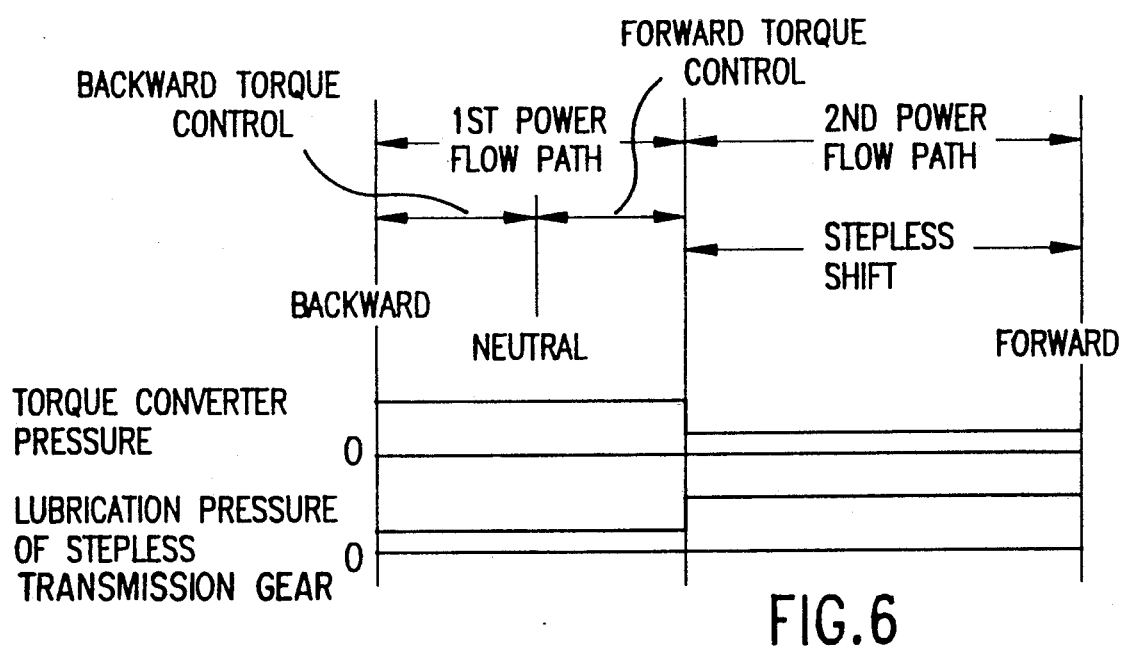
FIG. 6 is a chart illustrating operation of the stepless transmission shown in FIG. 1.

According to the stepless transmission of the present invention, upon driving backward in the reverse (R) range and upon starting forward in the drive (D) range, the input clutch 30 is unlocked. Engine output power is transmitted through the first power flow path 25 to the output shaft 6. Under this condition, the stepless transmission 32 is left unused, so that it is unnecessary to control the angle of inclination of the roller assemblies 35. The control valve 57 is controlled to substantially close the opening 60 in communication with the stepless transmission 32 and decrease the quantity of lubrication oil delivered to the stepless transmission 32. On such a decrease in lubrication oil pressure in the stepless transmission 32, as shown in FIG. 6, there is a decrease in engine power loss upon driving backward in the reverse (R) range and upon starting forward in the drive (D) range.

During forward driving in the drive (D) range, the input clutch 30 is locked, so as to transmit engine output power through the second power flow path 40 to the output shaft 6. Under this condition, the control valve 57 is controlled to open the opening 60 in communication with the stepless transmission 32 so as to increase the quantity of lubrication oil delivered to the stepless transmission 32. Simultaneously, the control valve 57 is controlled to substantially close the opening 59 in communication with the torque convertor 2, so as to decrease the quantity of working oil delivered to the torque convertor 2. As a result, as shown in FIG. 6, during forward driving in the drive (D) range, a rise in lubrication oil pressure in the stepless transmission 32 and a drop in working oil pressure in the torque convertor 2 are provided, so that a decrease in engine output loss and an improvement in fuel economy are produced.

Figure 7:
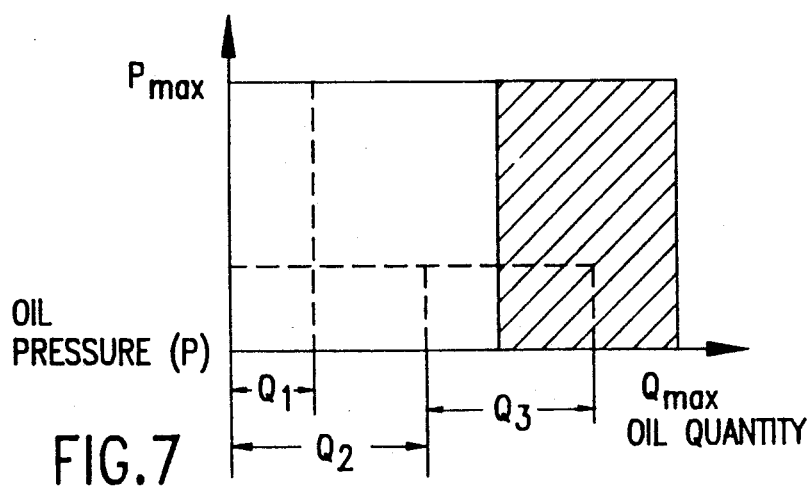
FIG. 7 is a graph illustrating the capacity of an oil pump.

FIG. 7 shows a "necessary" capacity of the oil pump 41. The oil pump 41 is required to develop a discharge pressure P corresponding to a maximum pressure Pmax needed by the input clutch 30. However, the oil pump 41 is not required to discharge a quantity O of oil equal to a total quantity of oil Qmax, which is a sum of the quantities $Q_1 + Q_2 + Q_3$ needed by the input clutch 30, the torque convertor 2 and the stepless transmission 32, respectively. It is sufficient for the oil pump 41 to discharge the greater of oil quantities $Q_1 + Q_2$ and oil quantities $Q_1 + Q_3$. Accordingly, the quantity of oil which must be discharged by the oil pump 41 is reduced by the amount represented by a shaded area in FIG. 7.

Figure 8:
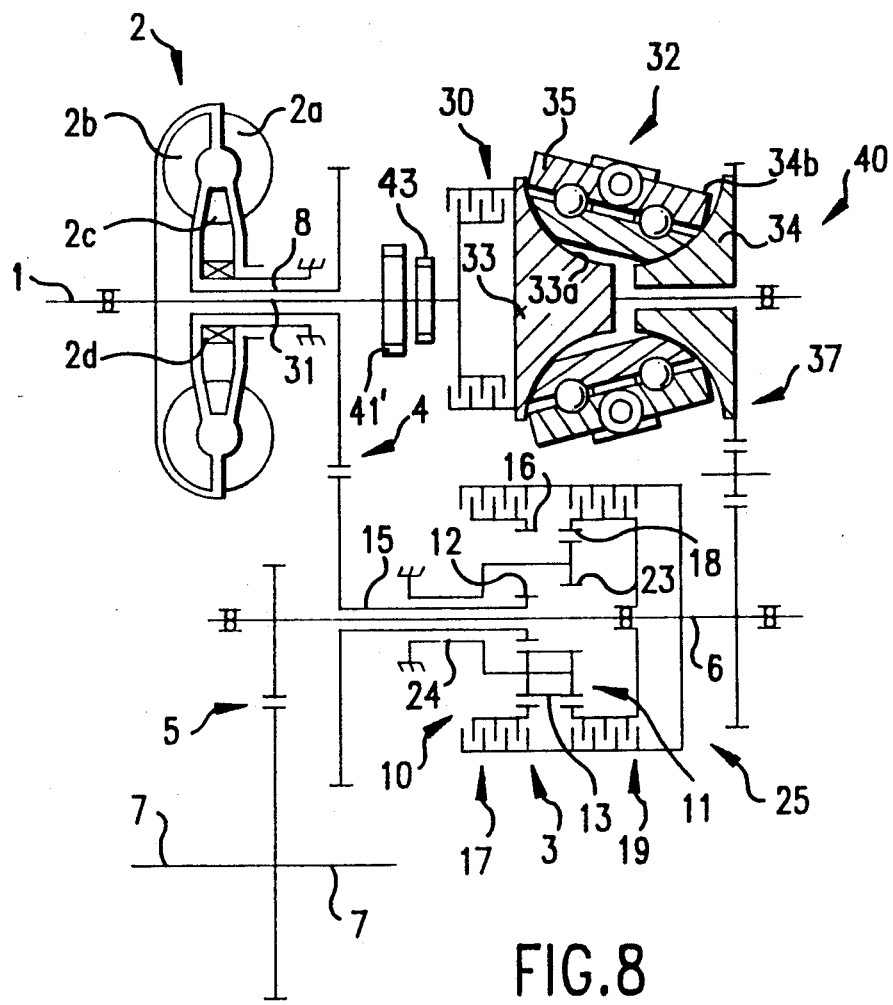
FIG. 8 is a skeleton diagram showing a stepless transmission in accordance with another preferred embodiment of present invention.

FIG. 8 shows a stepless transmission in accordance with another preferred embodiment of the present invention. In this embodiment, oil pumps, i.e., a primary oil pump and a secondary oil pump, are provided. The primary oil pump 41' and the secondary oil pump 43 are connected to the shaft extension 31 of the engine output shaft 1. The primary oil pump 41' is of a type developing a low oil pressure and discharging a large quantity of oil. The secondary oil pump 43 is of a type developing a high oil pressure and discharging a small quantity of oil.

Figure 9:
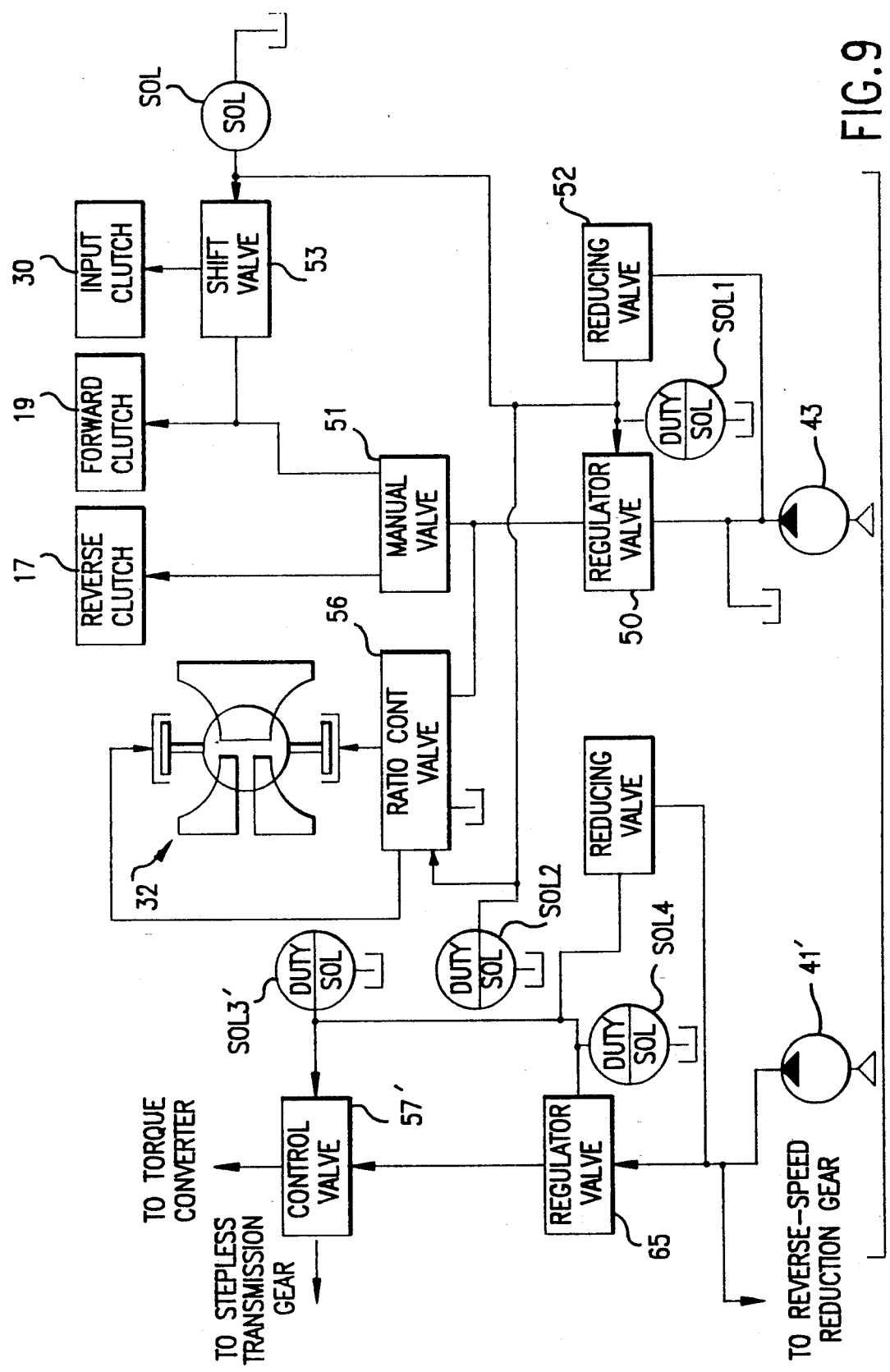
FIG. 9 is a diagram showing a hydraulic control circuit for the stepless transmission shown in FIG. 8.

Operation of the stepless transmission utilizing such primary and secondary oil pumps 41' and 43 takes place under a control provided by a hydraulic control circuit shown in FIG. 9. In this hydraulic control circuit, almost all elements, except for the primary and secondary oil pumps 41' and 43, are the same in structure and operation as those of the hydraulic control circuit shown in FIG. 4.

Referring to FIG. 9, the primary oil pump 41' is associated with a duty solenoid valve SOL4 for controlling a line pressure for a regulator valve 65. The primary oil pump 41' delivers a low pressure oil, regulated by the regulator valve 65, to a control valve 57'. The operation of the control valve 57' is controlled by a duty solenoid SOL3'. The secondary oil pump 43 delivers high pressure oil to a reverse clutch 17 and a forward clutch 19 of a reverse and reduction gear 3, an input clutch 30, and a stepless transmission 32. The control valve 57' and the duty solenoid valve SOL3' have the same structure and operation as the control valve 57 and the duty solenoid valve SOL3 of the hydraulic control circuit shown in FIG. 4.

When the first power flow path 25, including the torque converter 2, is established, the quantity of oil delivered to the stepless transmission 3 by the primary oil pump 41' is controlled by the control valve 57' so that it drops. On the other hand, when the second power flow path 40, including the stepless transmission 32, is established, the quantity of oil delivered to the torque converter 2 by the primary oil pump 41' is controlled by the control valve 57' so that it drops. Consequently, in the hydraulic control circuit, only that quantity of oil which is absolutely necessary is discharged. Losses in engine output, therefore, are decreased, and improved fuel economy is provided.

Figure 10:
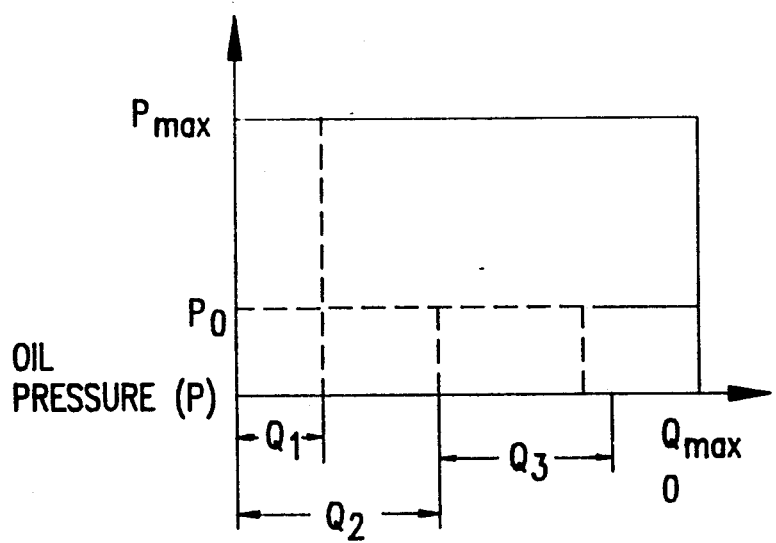
FIG. 10 is a graph illustrating the capacity of an oil pump.

As shown in FIG. 10, the oil pump 41' is required to develop a discharge pressure p corresponding to a low pressure Po needed by the input clutch 30. Furthermore, it is only necessary for the oil pump 41' to discharge the greater of the oil quantity Q2 needed by the torque convertor 2 and the oil quantity Q3 needed by the stepless transmission 32. It is sufficient for the secondary oil pump 43 to discharge a small quantity of oil Q1 at a maximum pressure Pmax needed by the input clutch 30. As compared to the provision of one oil pump for discharging a large quantity of oil (Q1+Q2+Q3) at a high oil pressure Pmax, the decrease in engine output loss is considerable.

It is to be understood that a stepless transmission of the invention can be used with a rear wheel drive vehicle as well as a front wheel drive vehicle. Also, although the present invention has been described with respect to a preferred embodiment thereof, various other embodiments and variants may occur to those skilled in the art. Any such other embodiments and variants which fall within the spirit and scope of the invention are intended to be covered by the following claims.

What is claimed is:

1. A stepless transmission having a torque converter fastened to an engine output shaft, a stepless transmission gear connected to the engine output shaft and a reverse and reduction gear operationally coupled to the torque converter for an automotive vehicle, comprising:

first means for establishing a first power flow path, including the torque converter and the reverse and reduction gear, through which engine output is transmitted to an output shaft of the stepless transmission;

second means for establishing a second power flow path, including the stepless transmission gear, through which engine output is transmitted to said output shaft of the stepless transmission; and oil control means, including at least one oil pump, for causing a decrease in quantity of a lubrication oil delivered to the stepless transmission gear while said first means establishes said first power flow path, and causing a decrease in quantity of a working oil delivered to the torque converter while said second means establishes said second power flow path.

2. A stepless transmission as defined in claim 1, wherein said first means comprises hydraulically operated clutch means installed in the reverse and reduction gear for operationally coupling and the reverse and reduction gear to and uncoupling the reverse and reduction gear from said output shaft, said hydraulically operated clutch means being locked so as to couple the reverse and reduction gear, thereby establishing said first power flow path.

3. A stepless transmission as defined in claim 2, wherein said hydraulically operated clutch comprises a forward clutch.

4. A stepless transmission as defined in claim 2, wherein said hydraulically operated clutch means comprises a reverse clutch.

5. A stepless transmission as defined in claim 1, wherein said second means comprises hydraulically operated clutch means disposed between the engine output shaft and the stepless transmission gear for connecting a transmission of engine output to and disconnecting the transmission of engine output from the stepless transmission gear, said hydraulically operated clutch means being locked so as to directly couple the engine output shaft and the stepless transmission gear, thereby establishing said second power flow path.

6. A stepless transmission as defined in claim 1, wherein said oil pump is mounted on and driven by the engine output shaft.

7. A stepless transmission as defined in claim 1, wherein said oil control means includes two oil pumps, one of which delivers a large amount of oil at a low pressure to the torque converter and the stepless transmission gear and the other of which delivers a small amount of oil at a high pressure to the reverse and reduction gear and said second means, said oil control means controlling a quantity of oil delivered by said other oil pump.

* * * * *